(12) United States Patent
Haller

(10) Patent No.: US 11,279,264 B2
(45) Date of Patent: Mar. 22, 2022

(54) VEHICLE SEAT

(71) Applicant: GRAMMER AG, Ursensollen (DE)

(72) Inventor: Erwin Haller, Birgland (DE)

(73) Assignee: Grammer AG

(*) Notice: Subject to any disclaimer, the term of this patent is extended or adjusted under 35 U.S.C. 154(b) by 0 days.

(21) Appl. No.: 17/082,386

(22) Filed: Oct. 28, 2020

(65) Prior Publication Data

US 2021/0155124 A1 May 27, 2021

(30) Foreign Application Priority Data

Nov. 22, 2019 (DE) .......................... 102019131595.6

(51) Int. Cl.
*B60N 2/20* (2006.01)
*B60N 2/38* (2006.01)
(Continued)

(52) U.S. Cl.
CPC ............... *B60N 2/20* (2013.01); *B60N 2/38* (2013.01); *A47C 1/032* (2013.01); *A47C 1/0355* (2013.01);
(Continued)

(58) Field of Classification Search
CPC ...... B60N 2/2209; B60N 2/0284; B60N 2/38; B64D 11/064; A47C 1/032; A47C 1/0355
See application file for complete search history.

(56) References Cited

U.S. PATENT DOCUMENTS 3,043,621 A * 7/1962 Peters .................. A47C 1/0355
297/85 R
3,104,128 A * 9/1963 Schliephacke ....... A47C 1/0352
297/85 R
(Continued)

FOREIGN PATENT DOCUMENTS

DE 4405653 8/1994
DE 19823632 9/1999
(Continued)

OTHER PUBLICATIONS

Official Action for German Patent Application No. 102019131595.6, dated Jun. 3, 2020, 6 pages.
(Continued)

*Primary Examiner* — Syed A Islam
(74) *Attorney, Agent, or Firm* — Sheridan Ross P.C.

(57) ABSTRACT

Vehicle seat having a backrest part and a backrest base part, a seat part and a seat base part, wherein the seat part is displaceable with respect to the seat base part and wherein the backrest part is rotatably connected to the backrest base part, the backrest base part and the seat base part being connected to one another by means of a lever assembly, wherein the lever assembly has a first lever element which is rotatably connected to the backrest and the seat base part, and a second lever element, which comprises a first lever element part and a second lever element part, wherein the first lever element part is rotatably connected to the backrest base part and the second lever element part, and the second lever element part is rotatably connected to the first lever element part and an adjustment device, wherein the adjustment device is rotatably connected to the seat base part.

10 Claims, 10 Drawing Sheets

(51) Int. Cl.
- *B60N 2/22* (2006.01)
- *B60N 2/02* (2006.01)
- *A47C 1/0355* (2013.01)
- *A47C 1/032* (2006.01)
- *B64D 11/06* (2006.01)

(52) U.S. Cl.
CPC .......... *B60N 2/0284* (2013.01); *B60N 2/2209* (2013.01); *B64D 11/064* (2014.12)

(56) References Cited

U.S. PATENT DOCUMENTS

| | | | |
|---|---|---|---|
| 3,166,353 A * | 1/1965 | Re | A47C 1/0355 297/75 |
| 3,198,576 A | 8/1965 | Rosmarin | |
| 3,869,172 A | 3/1975 | James et al. | |
| 4,226,473 A | 10/1980 | Johnson | |
| 4,350,387 A * | 9/1982 | Rogers, Jr. | A47C 1/0355 297/322 |
| 4,452,486 A | 6/1984 | Zapf et al. | |
| 4,504,090 A * | 3/1985 | Goldman | A47C 1/03255 297/317 |
| 5,374,101 A * | 12/1994 | Wiecek | A47C 1/0355 297/75 |
| 6,135,559 A * | 10/2000 | Kowalski | A47C 1/024 297/301.5 |
| 6,481,798 B2 | 11/2002 | Romca et al. | |
| 8,272,694 B2 | 9/2012 | Hawkins et al. | |
| 9,701,221 B2 | 7/2017 | Nagayasu | |
| 10,744,912 B2 * | 8/2020 | Haller | B60N 2/501 |
| 2013/0134758 A1 | 5/2013 | Kladde | |
| 2014/0265501 A1 | 9/2014 | Line et al. | |
| 2021/0122267 A1 | 4/2021 | Haller | |

FOREIGN PATENT DOCUMENTS

| | | |
|---|---|---|
| DE | 202012003009 | 6/2013 |
| DE | 202014104538 | 11/2014 |
| DE | 102017128410 | 6/2019 |
| EP | 0265782 | 5/1988 |
| EP | 3181397 | 6/2017 |
| EP | 3505393 | 7/2019 |

OTHER PUBLICATIONS

Extended Search Report with machine translation for European Patent Application No. 20203403.9, dated Mar. 25, 2021, 7 pages.
Official Action for German Patent Application No. 102019129174.7, dated Jun. 22, 2020, 6 pages.
Official Action with English Translation for German Patent Application No. 102019129174.7, dated Sep. 10, 2021, 5 pages.
Extended Search Report for European Patent Application No. 20203404.7, dated Mar. 17, 2021, 7 pages.
Official Action for U.S. Appl. No. 17/082,410, dated Sep. 13, 2021 8 pages.

* cited by examiner

VEHICLE SEAT

CROSS-REFERENCE TO RELATED APPLICATIONS

This application claims the benefit of German Patent Application No. 10 2019 131 595.6 filed Nov. 22, 2019, the entire contents of which are incorporated herein by reference.

FIELD

The invention relates to a vehicle seat having a backrest part and a backrest base part, a seat part and a seat base part, wherein the seat part is displaceable with respect to the seat base part and the backrest part is rotatably connected to the backrest base part.

BACKGROUND

Vehicle seats of the generic type for off-road vehicles, trucks, MH-Turf, etc., contain standard devices for isolating vibrations, which keep harmful influences away from the driver or reduce them. These constitute, in particular, vibrations in vertical and horizontal directions. The vibrations are usually reduced in translational degrees of freedom. In the systems known today, the placement of the degrees of freedom is realised on the one hand in the vertical suspensions and integrated on the other hand as separate modules in the overall system of the vehicle seat.

The six dynamic driving degrees of freedom of work machines lead, when the vehicle is being operated, to movements that can have an unpleasant and harmful effect on the driver. These include shifts in the direction of the longitudinal axis, the width axis or the height axis of the vehicle.

Rotational movements about the longitudinal axis x (rolling movement), about the width axis (pitching movement) or about the height axis (yawing movement) of the vehicle are possible as well. A pitching vehicle thus performs a rotational movement about the width axis of the vehicle, which is triggered, for example, when driving over an obstacle in the forward direction of travel along the longitudinal axis.

The disadvantage of known systems, however, is that the suspension systems for the backrest and the seat part often work separately. This means that a comprehensive vibration reduction is not possible.

As a general rule, vibrations are best reduced if the direction of the movement induced when the vibration is initiated is exactly opposite to the direction of the movement inherent in the vibration. If the direction or the vector deviates therefrom, "unnecessary" motion components are also induced, the direction of which is such that they cannot contribute to the reduction of the vibrations.

SUMMARY

It is therefore the object of the present invention to further develop a generic vehicle seat with a simpler design than shown in the prior art in such a way that the vibrations are reduced as effectively as possible.

The underlying object of the present application is achieved by a vehicle seat having the features of claim 1.

The central idea of the present invention is to provide a vehicle seat having a backrest part and a backrest base part, a seat part and a seat base part, wherein the seat part is displaceable with respect to the seat base part and wherein the backrest part is rotatably connected to the backrest base part, wherein the backrest base part and the seat base part are connected to one another by means of a lever assembly, wherein the lever assembly has a first lever element which is rotatably connected to the backrest and the seat base part, and a second lever element, which comprises a first lever element part and a second lever element part, wherein the first lever element part is rotatably connected to the backrest and the second lever element part and the second lever element part is rotatably connected to the first lever element part and an adjustment device, wherein the adjustment device is rotatably connected to the seat base part.

The backrest base part and the seat base part are particularly advantageously spring-mounted by means of the lever assembly, i.e. in particular the backrest part and the seat part are spring-mounted.

According to a particularly preferred embodiment, the first lever element is rotatably connected to the backrest about a first axis of rotation and rotatably connected to the seat base part about a second axis of rotation, wherein the first lever element part is rotatably connected to the backrest about a third axis of rotation and rotatably connected to the second lever element part about a fourth axis of rotation, and wherein the second lever element part is rotatably connected to the adjustment device about a fifth axis of rotation, wherein the adjustment device is rotatably connected to the seat base part about a sixth axis of rotation.

The axes of rotation are, in particular, formed independently of one another. The axes of rotation can be formed by a pin, a shaft or the like.

According to the invention, it is provided that, by means of the adjustment device, which is rotatably connected on the one hand to the seat base part about the sixth axis of rotation and on the other hand to the second lever element part about the fifth axis of rotation, the second lever element part rotates when the adjustment device is rotated. The position of the sixth axis of rotation is fixed with respect to the seat base part when the adjustment device is rotated, whereas the position of the fifth axis of rotation changes when the adjustment device is rotated about the sixth axis of rotation, i.e. in that the fifth axis of rotation is rotated about the sixth axis of rotation.

According to a preferred embodiment, the sixth axis of rotation is fixedly arranged with respect to the seat base part, wherein the second axis of rotation is fixedly arranged with respect to the seat base part, and wherein the first axis of rotation is fixedly arranged with respect to the backrest base part, and wherein the third axis of rotation is fixedly arranged with respect to the backrest base part.

The term "fixedly" is to be understood to mean that the structural configuration does not move relative to the respective component, except for the rotation.

The fourth axis of rotation and the fifth axis of rotation are particularly preferably not arranged in a fixed manner; the fourth axis of rotation, which rotatably connects the first lever element part and the second lever element part to one another, and the fifth axis of rotation, which rotates about the sixth axis of rotation when the adjustment device is actuated, are not designed to be fixed with respect to a component. This applies in particular to a movement of the backrest base part with respect to the seat base part by means of the lever assembly.

According to a preferred embodiment, a first connecting line is formed between the first axis of rotation and the second axis of rotation, a second connecting line between the third axis of rotation and the fourth axis of rotation and a third connecting line between the fifth axis of rotation and the sixth axis of rotation.

These connecting lines can be used to describe in more detail a movement or an adjustment by means of or due to the adjustment device or when the backrest base part moves relative to the seat base part.

According to a further preferred embodiment, the seat part is rotatably connected to the backrest base part on the one hand, in particular about a seventh axis of rotation, wherein on the other hand, a third lever element part is provided which is rotatably connected to the seat part, in particular about an eighth axis of rotation, and the seat base part, in particular about a ninth axis of rotation.

The third lever element part is particularly advantageously arranged in a front region of the seat part or the seat base part when viewed in the longitudinal direction.

Such an arrangement allows the seat part to follow the movement of the backrest base part, as a result of which the seat part can be displaced backward and forward when seen in the longitudinal direction. In this case, a displacement is a translational displacement and, if applicable, additionally a rotary displacement, i.e. a movement which follows the pitching movement of the vehicle.

According to a further preferred embodiment, a first distance between the first axis of rotation and the second axis of rotation corresponds to a distance between the third axis of rotation and the fourth axis of rotation.

This means that, due to the design of the first lever element and the second lever element, the length of the second lever element is always greater than that of the first lever element, more precisely the length between the third axis of rotation and the fifth axis of rotation is greater than the distance between the first axis of rotation and the second axis of rotation.

According to a particularly preferred embodiment, a first position, a second position and a third position of the second lever element part can be adjusted by means of the adjustment device, wherein, in the first position, the first connecting line is parallel to the second connecting line and, in the second position, the first connecting line and the second connecting line enclose a first angle and, in the third position, the first connecting line and the second connecting line enclose a second angle.

If the first connecting line and the second connecting line are arranged parallel to one another, i.e. in the first position, this means that the backrest base part moves in a translational manner with respect to the seat base part. The third lever element is further preferably designed such that the third lever element is parallel to the first lever element, regardless of the position of the second lever element. This means that the seat part is moved in a translational manner as well.

In the second position, i.e. when the first connecting line and the second connecting line enclose a first angle, this is equivalent to a rotation of the backrest base part about a fictitious pivot point, which is preferably arranged below the seat base part, when viewed in the vertical direction.

In the third position, i.e. when the first connecting line and the second connecting line enclose a second angle, this is equivalent to a rotation of the backrest base part about a fictitious pivot point, which is preferably arranged below the seat base part, when viewed in the height direction, and which is shifted in the vertical direction compared to the fictitious pivot point of the second position.

The first angle is particularly preferably smaller than the second angle. The first angle is particularly preferably smaller than 10°, more preferably smaller than 7°. The second angle is smaller than 20°, more preferably smaller than 15° and particularly preferably smaller than 13°.

According to a further preferred embodiment, it is provided that the second connecting line and the third connecting line enclose a third angle in the first position, enclose a fourth angle in the second position and enclose a fifth angle in the third position.

By specifying the angle between the first lever element part and the second lever element part, the position of the first lever element part in relation to the second lever element part is described.

In the first position, i.e. when the first connecting line is parallel to the second connecting line, the second connecting line and the third connecting line enclose a third angle. This third angle is particularly preferably at least 150°, more preferably at least 140° and particularly preferably 130° or more than 130°.

In the second position, i.e. when the first connecting line and the second connecting line enclose the first angle, the second connecting line and the third connecting line enclose a fourth angle. The fourth angle is particularly preferably 180°.

In the third position, i.e. when the first connecting line and the second connecting line enclose the second angle, the second connecting line and the third connecting line enclose a fifth angle. The angle is particularly preferably at least 30°, more preferably at least 40° and particularly preferably 50° or more than 50°.

According to a particularly preferred embodiment, it is provided that a third distance between the third axis of rotation and the fifth axis of rotation can be changed by means of the adjustment device so that a position of a fictitious axis of rotation can be changed.

This means that, in relation to the distance between the first axis of rotation and the second axis of rotation, the length of the second lever element and the position of the second lever element part relative to the first lever element can be changed, by means of which a translational or a translational and rotational movement of the backrest base part with respect to the seat base part can be adjusted as needed.

According to a further preferred embodiment, it is provided that when the backrest base part moves with respect to the seat base part by means of the lever assembly, a seat part inclination of the seat part and a longitudinal position relative to the seat base part can be adjusted.

This is particularly advantageous in the case of a rotational movement of the backrest base part with respect to the seat base part, i.e. when the lever assembly is set to the second position or the third position. In the case of a translational movement of the backrest base part with respect to the seat base part, an adaptation of the movement of the backrest base part with respect to the seat base part is not necessary.

In particular, the seat inclination of the seat part is specified by the adjustment made by the adjustment device with said inclination changing further, in particular during a relative movement of the backrest base part with respect to the seat base part.

According to a further preferred embodiment, it is provided that the adjustment device is designed to be locked in different positions. A lock is provided, for example, so that the first position, the second position and the third position can be locked.

BRIEF DESCRIPTION OF THE DRAWINGS

Further advantageous embodiments are described in the dependent claims.

Additional objects, advantages and expedient uses of the present invention can be found in the following description in conjunction with the drawings. In the drawings.

DETAILED DESCRIPTION

Figure 1:
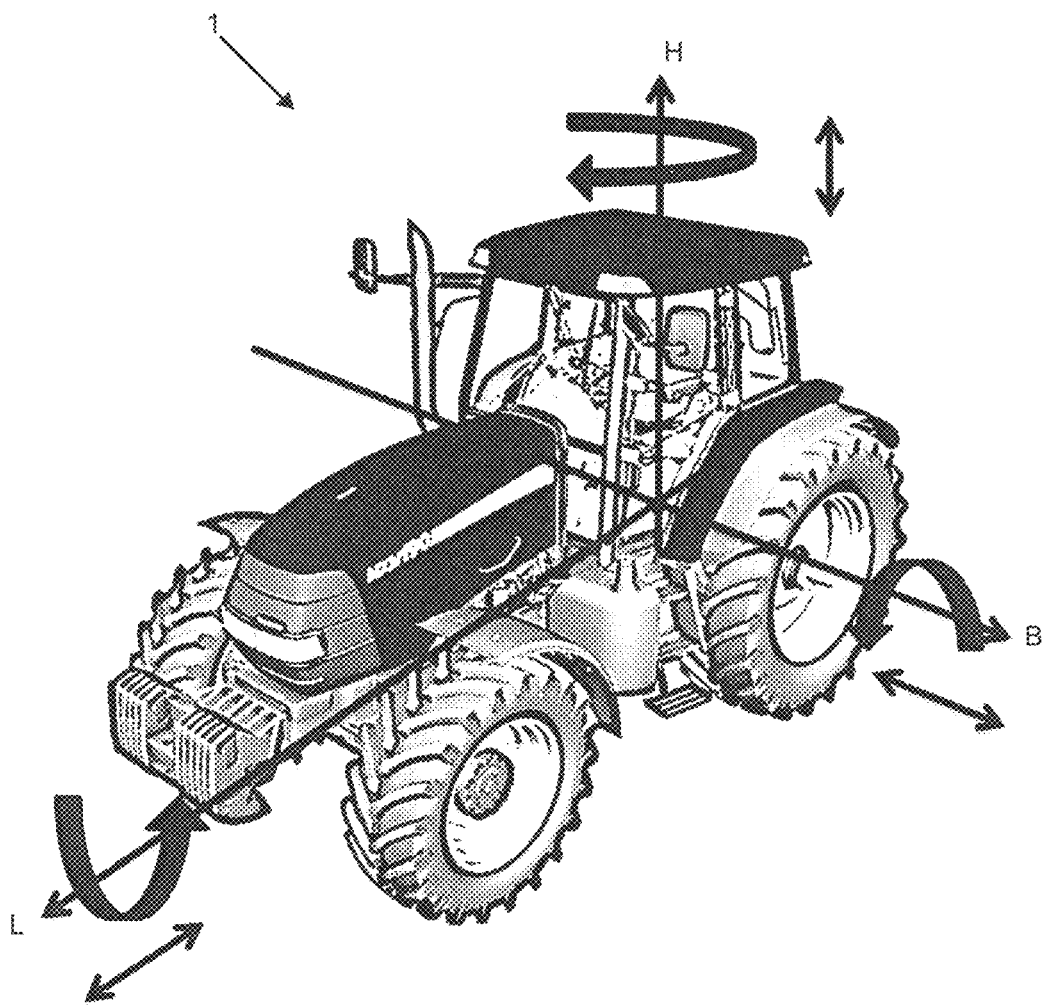
FIG. 1 shows a utility vehicle with different turning options.

In the drawings, the same components are provided with the same reference signs. For reasons of clarity, some reference signs may have been omitted.

The utility vehicle 1 shown in FIG. 1 demonstrates the typical movements of the utility vehicle, depending of course on the respective driving situation. In this case, translations of the utility vehicle along a longitudinal direction L, a width direction B and a height direction H can occur. Furthermore, rotations may occur about each of these axes L, B, H with rotation about the longitudinal axis L being known as roll R, rotation about the transverse direction B being known as pitch N, and rotation about the vertical axis H being known as yaw G. Typically, yaw is ignored for vehicles.

According to the invention, it is possible to absorb the movements "pitching" and "translation in the longitudinal direction" by means of the vehicle seat.

Figure 2A:
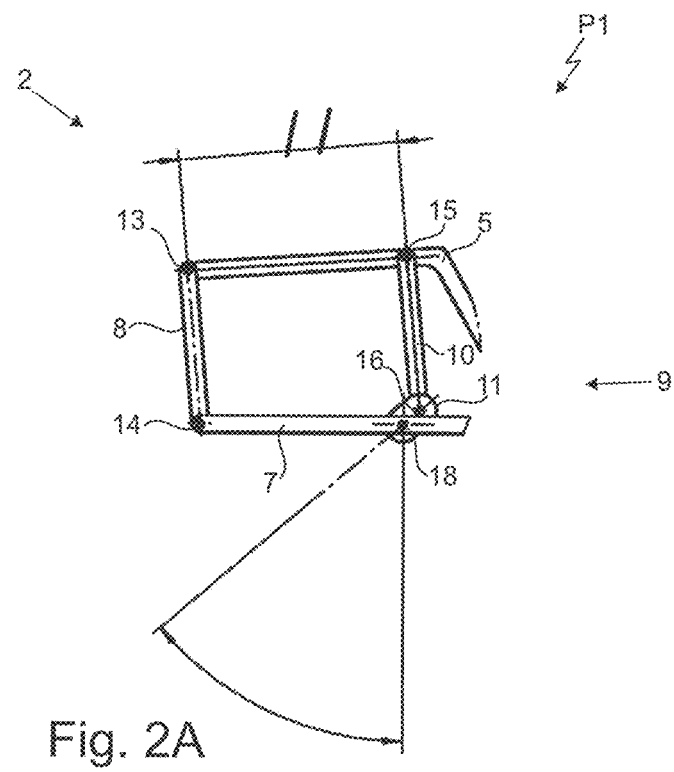
FIG. 2A shows a lever assembly in a first position.
Figures 2B, 2C:
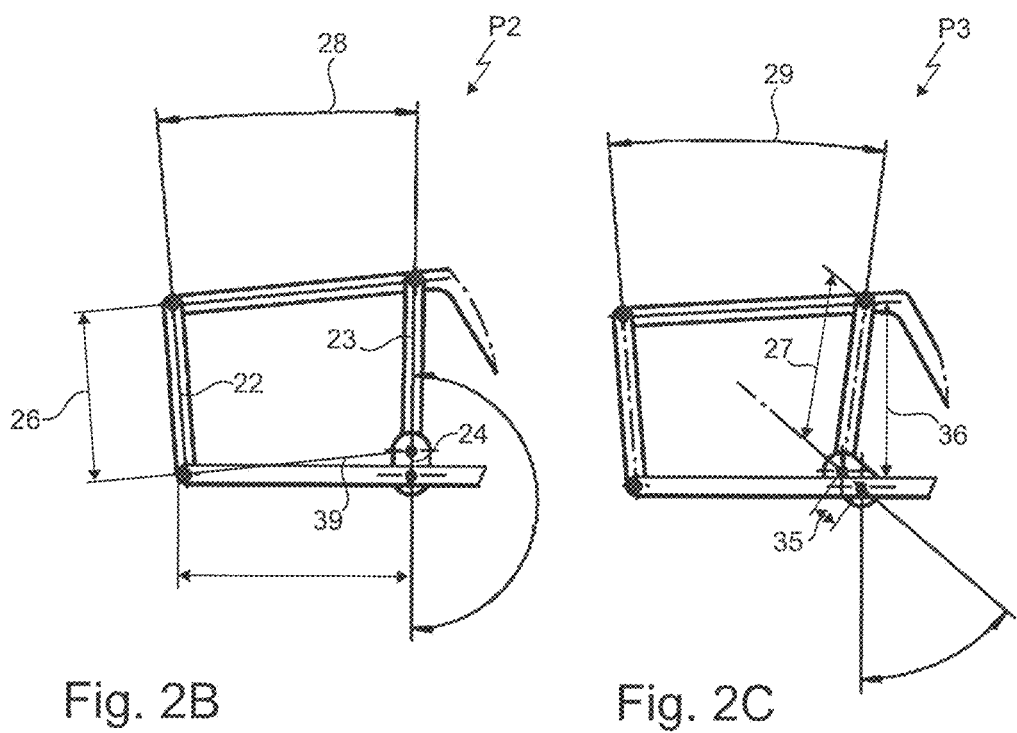
FIG. 2B shows a lever assembly in a second position.
FIG. 2C shows a lever assembly in a third position.

The three fundamentally different positions of a lever assembly 2 of a vehicle seat 3 (not shown here) are illustrated in FIGS. 2A, 2B and 2C. The drawings may be at different scales. These settings are adopted when there is no vibration of the backrest base part 5 with respect to a seat base part 7, i.e. when no external interference or the like occurs.

The lever assembly 2 is connected to the backrest base part 5 as well as to the seat base part 7 and preferably comprises a first lever element 8 and a second lever element 9, the second lever element 9 consisting of a first lever element part 10 and a second lever element part 11.

Furthermore, the first lever element part 8 is rotatably connected to the backrest base part 5 about a first axis of rotation 13 and rotatably connected to the seat base part 7 about a second axis of rotation 14.

The first lever element part 10 is rotatably connected to the backrest base part 5 about a third axis of rotation 15 and rotatably connected to the second lever element part 11 about a fourth axis of rotation 16, the second lever element part 11 being rotatably connected to the adjustment device 12 (not shown here) about a fifth axis of rotation 17, which is rotatably connected about a sixth axis of rotation 18.

It should be noted that the respective elements of FIGS. 2A, 2B and 2C are merely schematic representations.

In FIGS. 2A, 2B and 2C, the lever assembly 2 is shown in a neutral setting N, i.e. no force acts on the vehicle seat 3 which would cause a movement of the backrest base part 5 relative to the seat base part 7.

A second distance 27 between the third axis of rotation 15 and the fourth axis of rotation 16 is particularly preferably longer than a third distance 35 between the fourth axis of rotation 16 and the sixth axis of rotation 18.

Further preferably, the second distance 27 between the third axis of rotation 15 and the fourth axis of rotation 16 is equal to a first distance 26 between the first axis of rotation 13 and the second axis of rotation 14.

Overall, the second lever element 9 is designed such that a fourth distance 36 between the third axis of rotation 15 and the sixth axis of rotation 18 is variable and adjustable.

In addition, it is preferably provided that a fifth distance 37 between the first axis of rotation 13 and the third axis of rotation 15 is greater than a sixth distance 38 between the second axis of rotation 14 and the sixth axis of rotation 18.

Wth this configuration of the second lever element 9, a seat inclination of the seat part 6 can be adjusted. This can be seen by comparing FIGS. 2A, 2B and 2C with one another.

FIG. 2A shows the lever assembly 2 in a first position P1, i.e. the first lever element 8 and the first lever element part 10 are arranged parallel to one another. This means that a movement of the backrest base part 5 with respect to the seat base part 7 represents a translational movement. In this context, "parallel" means that a first connecting line 22 between the first axis of rotation 13 and the second axis of rotation 14 is parallel to a second connecting line 23 between the third axis of rotation 15 and the fourth axis of rotation 16.

FIG. 2B shows the lever assembly 2 in a second position P2, i.e. the first lever element 8 and the first lever element part 10 are no longer arranged parallel to one another but rather enclose a first angle 28. In the position P2, the second connecting line 23 and a third connecting line 24 between the fourth axis of rotation 16 and the sixth axis of rotation 18 are arranged in alignment with one another.

FIG. 2C shows the lever assembly 2 in a third position P3, i.e. the first lever element 8 and the first lever element part 10 are no longer arranged parallel to one another but rather enclose a second angle 29.

In particular, the direction of rotation from the first position P1 to the second position P2 and the third position P3 is such that a seventh distance 39 between the second axis of rotation 14 and the fourth axis of rotation 16 is reduced. As a result, the angle between the first lever element 8 and the first lever element part 10 is changed, making different movements of the backrest base part 5 with respect to the seat base part 7 possible.

Figure 3A:
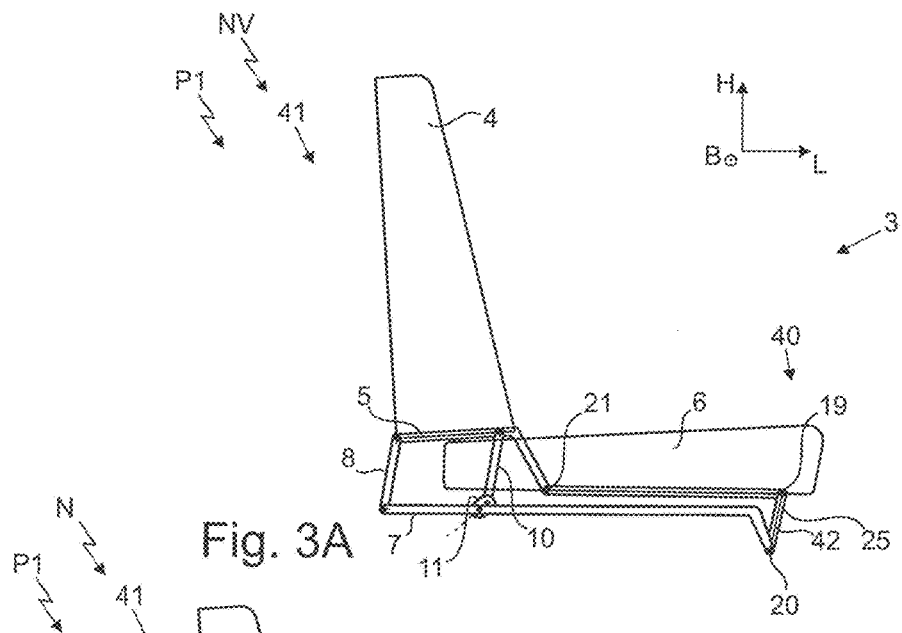
FIG. 3A shows a vehicle seat having a lever assembly in the first position in a forwardly displaced setting.
Figure 3B:
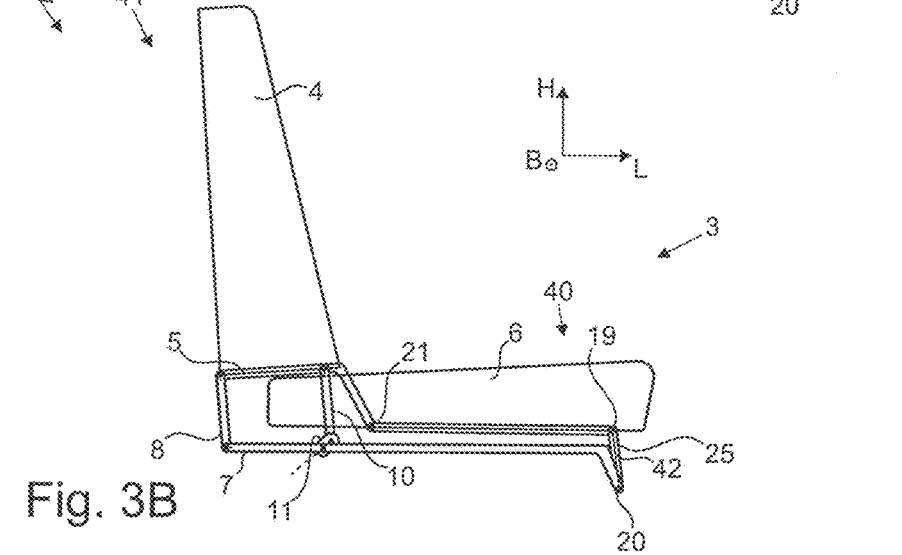
FIG. 3B shows a vehicle seat having a lever assembly in the first position in a neutral setting.
Figure 3C:
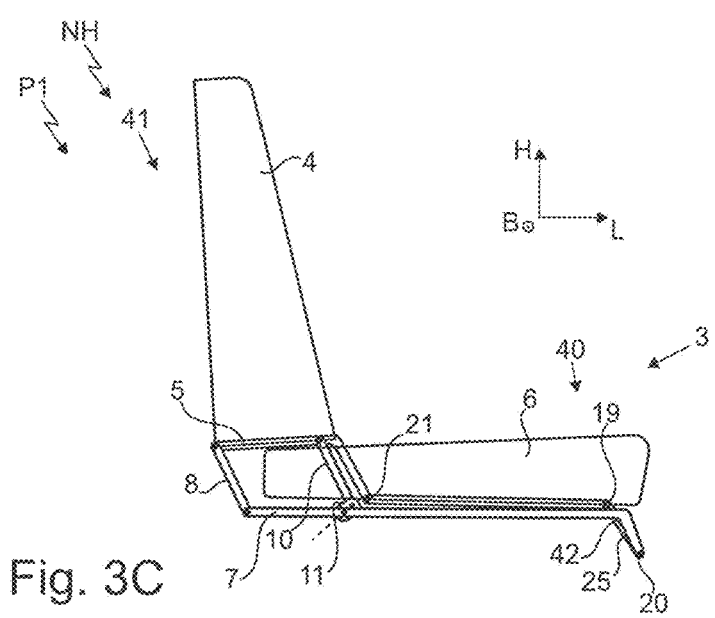
FIG. 3C shows a vehicle seat having a lever assembly in the first position in a rearwardly displaced position.

In FIGS. 3A, 3B and 3C, the vehicle seat 3 is shown in a schematic representation, in a forward movement NV in the longitudinal direction L, in the neutral setting N and in a backward movement NH, with the lever assembly being set in the first position P1.

Figure 3D:
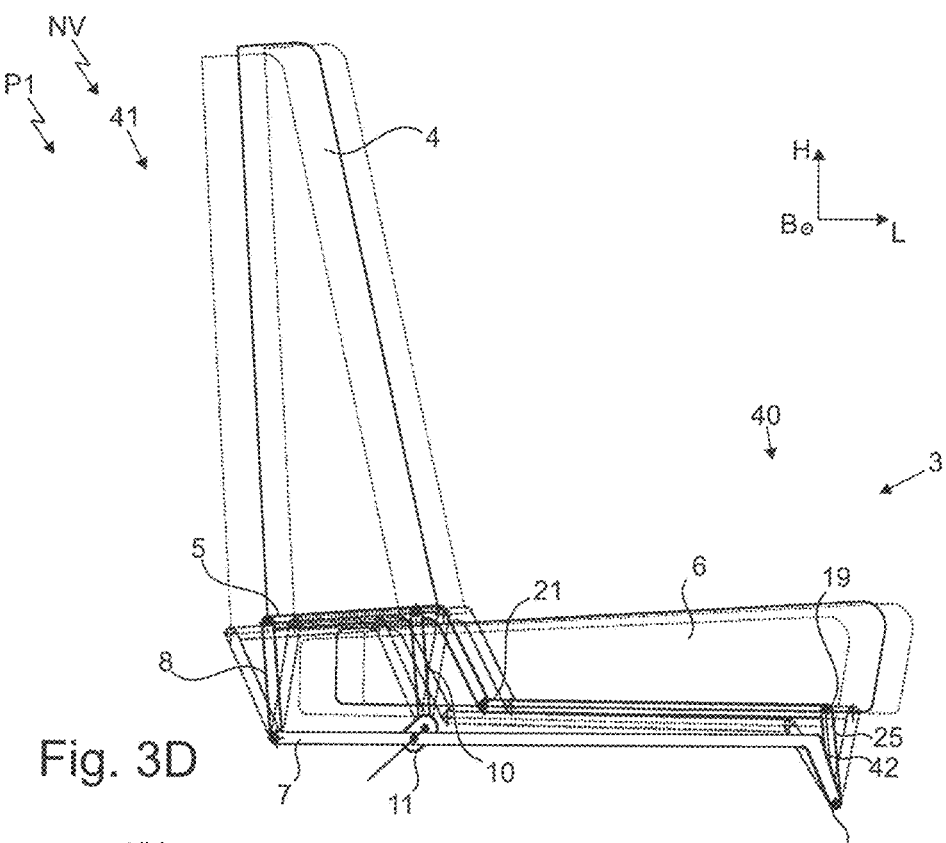
FIG. 3D shows a comparison between FIG. 3A-3C.

FIG. 3D is a superposition of FIGS. 3A, 3B and 3C.

The vehicle seat 3 comprises a backrest part 4, a backrest base part 5, a seat part 6 and a seat base part 7.

A third lever element part 25 is provided, which is on the one hand rotatably connected to the seat part 6 about a seventh axis of rotation 19 and on the other hand rotatably connected to the seat base part 7 about an eighth axis of rotation 8. Furthermore, the seat part 6 is rotatably connected to the backrest base part 5 about a ninth axis of rotation 21. The third lever element part 25 is aligned in such a way that it is arranged parallel to the first lever element 8, i.e. a fourth connecting line 42 between the seventh axis of rotation 19 and the eighth axis of rotation 20 is parallel to the first connecting line 22. This is preferably independent of the position of the lever assembly 2.

From the comparison of FIGS. 3A, 3B and 3C, it can be seen that the backrest base part 5 and the seat part 6 are moved in a translational manner with respect to the seat base part 7. Due to the arrangement and configuration of the lever assembly 2, a translational movement is composed of a translational movement in the longitudinal direction L and in the height direction H.

FIGS. 4A, 4B, 4C and 4D correspond to FIGS. 3A, 3B, 3C and 3D except for the lever assembly 2, which is now in the second position P2.

Figure 4A:
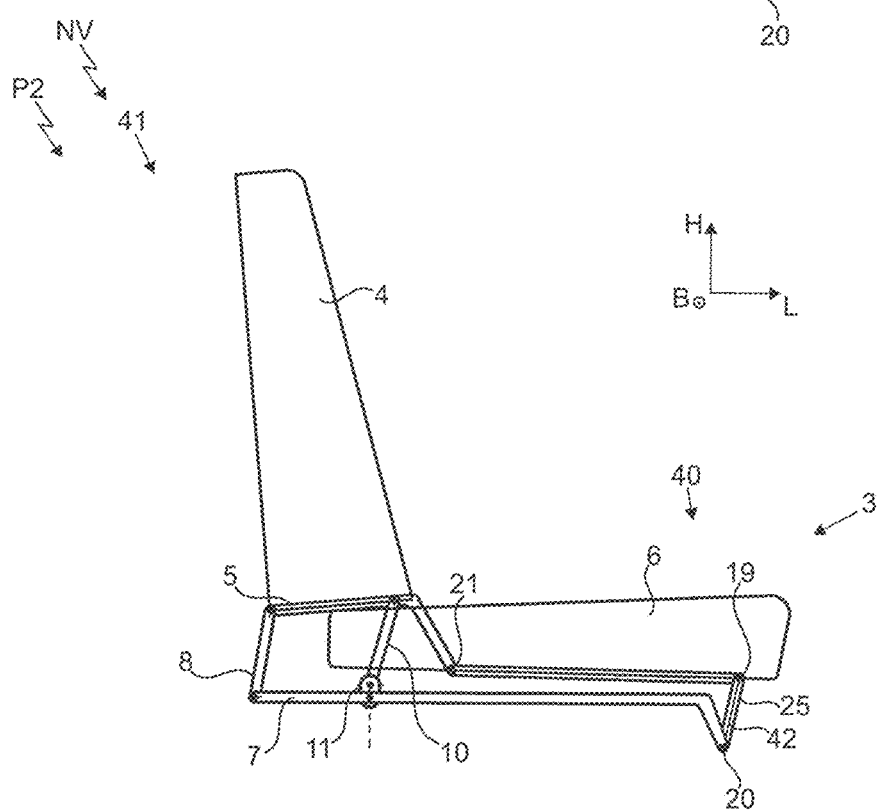
FIG. 4A shows a vehicle seat having a lever assembly in the second position in a forwardly displaced setting.
Figure 4B:
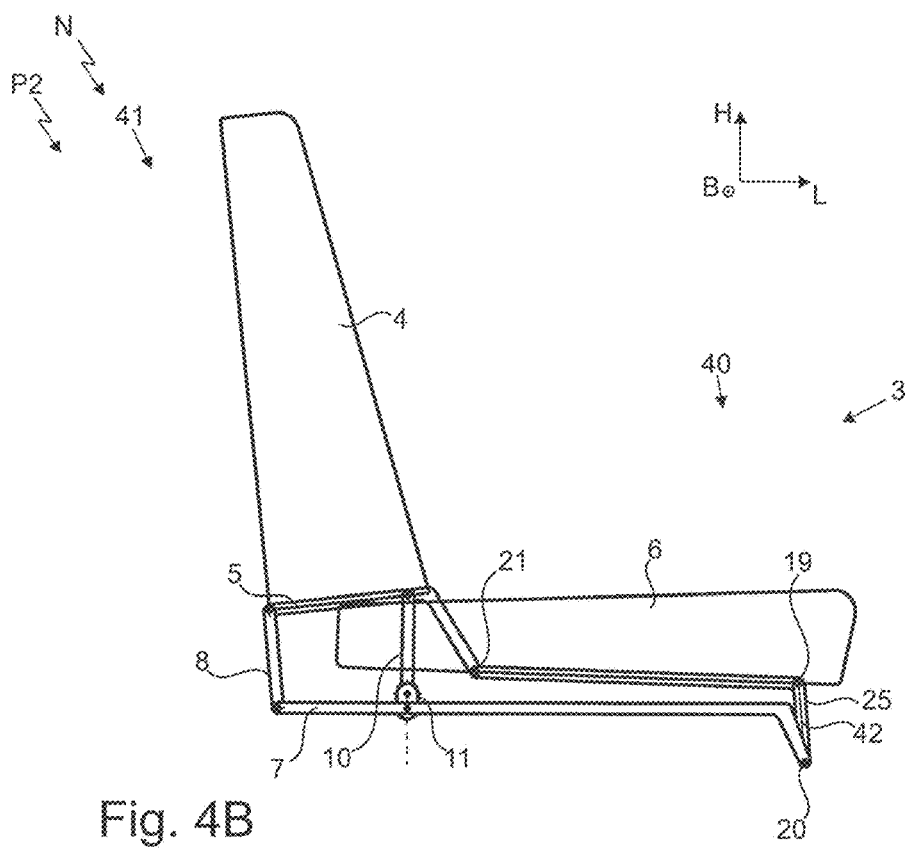
FIG. 4B shows a vehicle seat having lever assembly in the second position in a neutral setting.
Figure 4C:
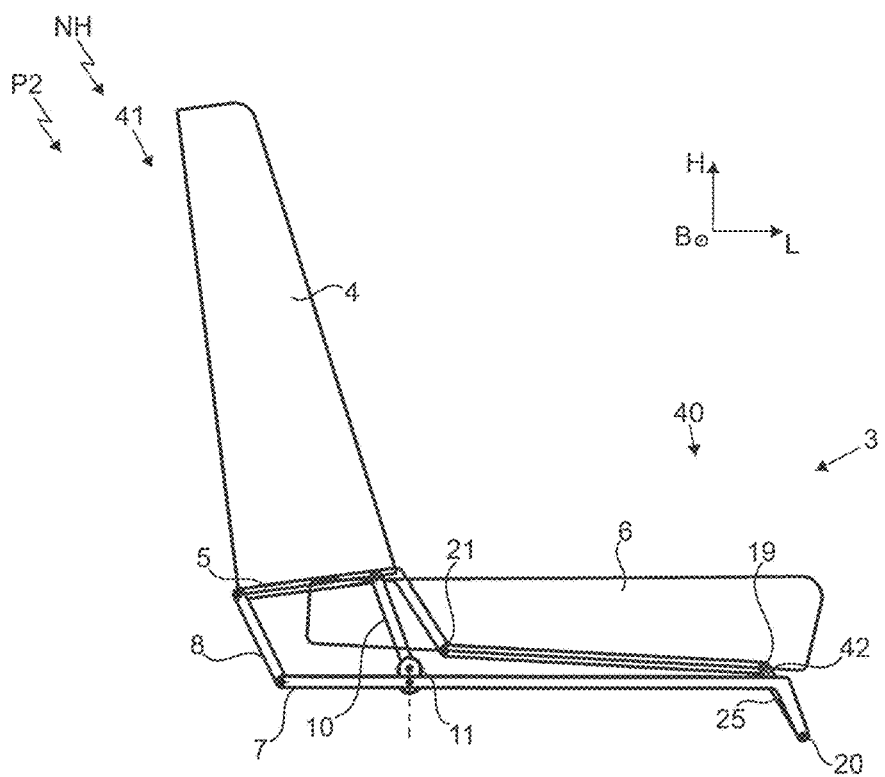
FIG. 4C shows a vehicle seat having a lever assembly in the second position in a rearwardly displaced setting.
Figure 4D:
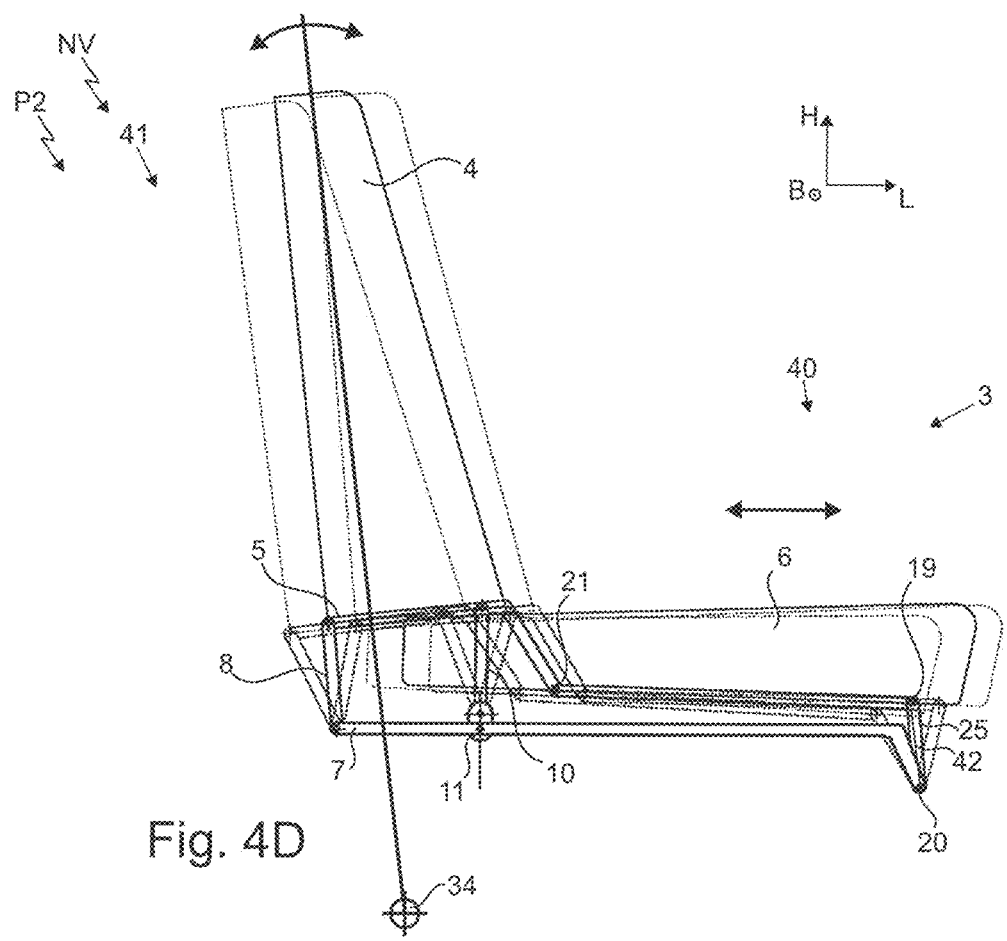
FIG. 4D shows a comparison between FIG. 4A-4C.

In the comparison of FIGS. 4A, 4B and 4C shown in FIG. 4D, it can be seen that the backrest base part 5 now has a rotational movement about a fictitious axis of rotation 34, which also results in a rotational movement of the seat part 6. In the event the vehicle performs a pitching movement, the vehicle seat can therefore effectively absorb this pitching movement.

FIGS. 5A, 5B, 5C and 5D correspond to FIGS. 3A, 3B, 3C and 3D except for the lever assembly 2, which is now in the third position P3.

Figure 5A:
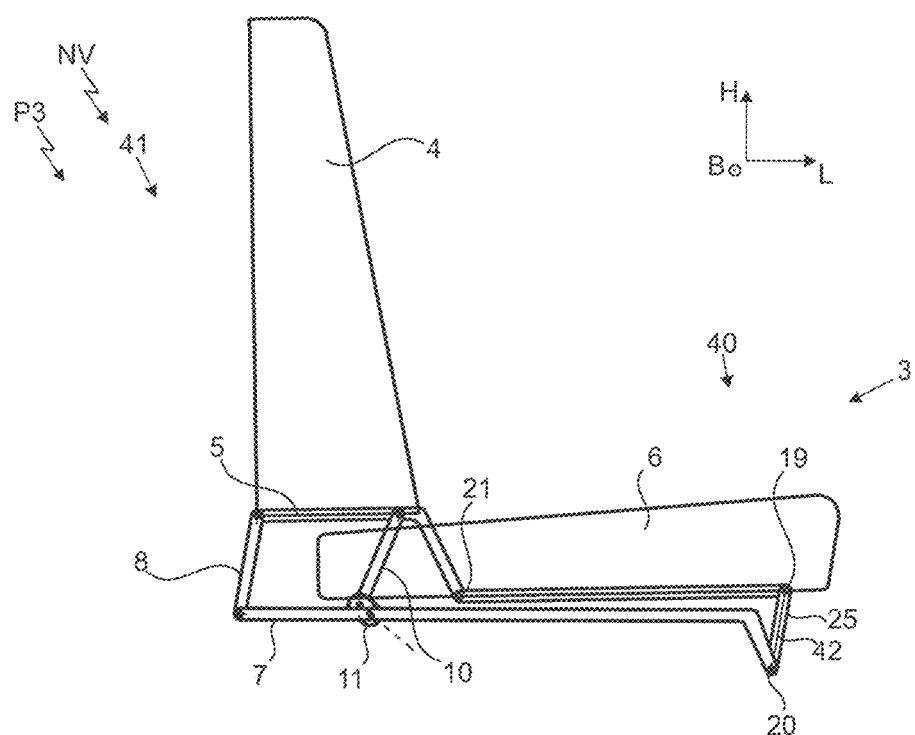
FIG. 5A shows a vehicle seat having a lever assembly in the third position in a forwardly displaced setting.
Figure 5B:
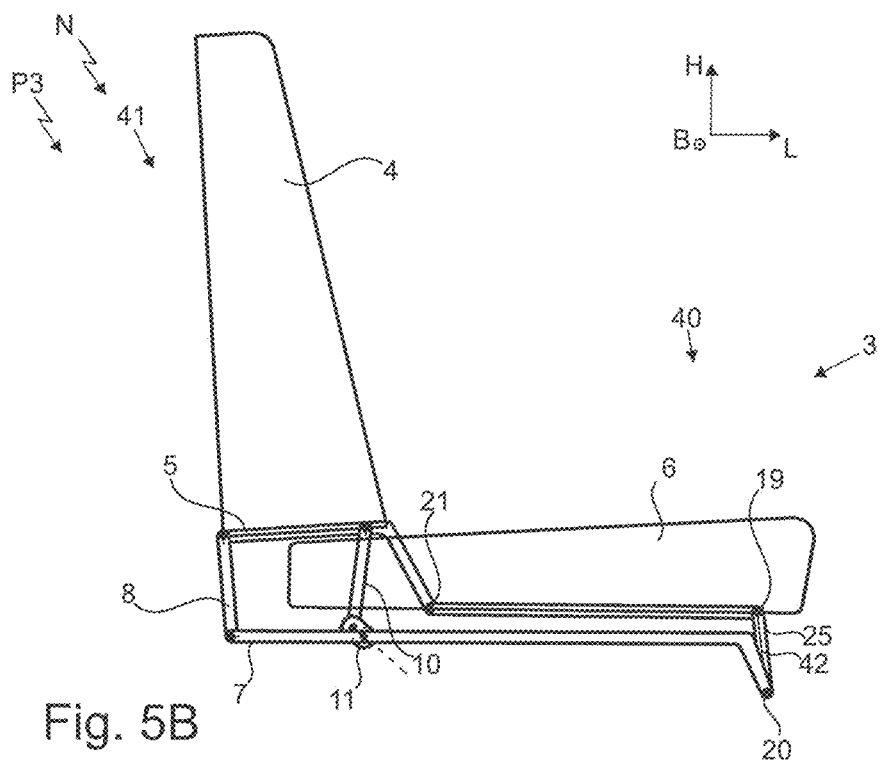
FIG. 5B shows a vehicle seat having a lever assembly in the third position in a neutral setting.
Figure 5C:
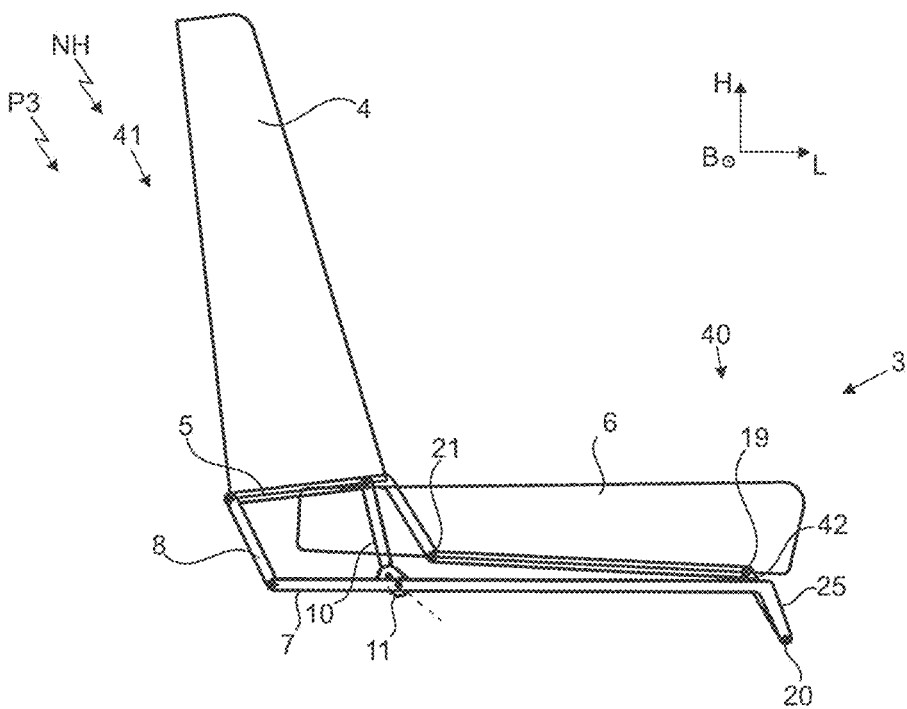
FIG. 5C shows a vehicle seat having a lever assembly in the third position in a rearwardly displaced setting.
Figure 5D:
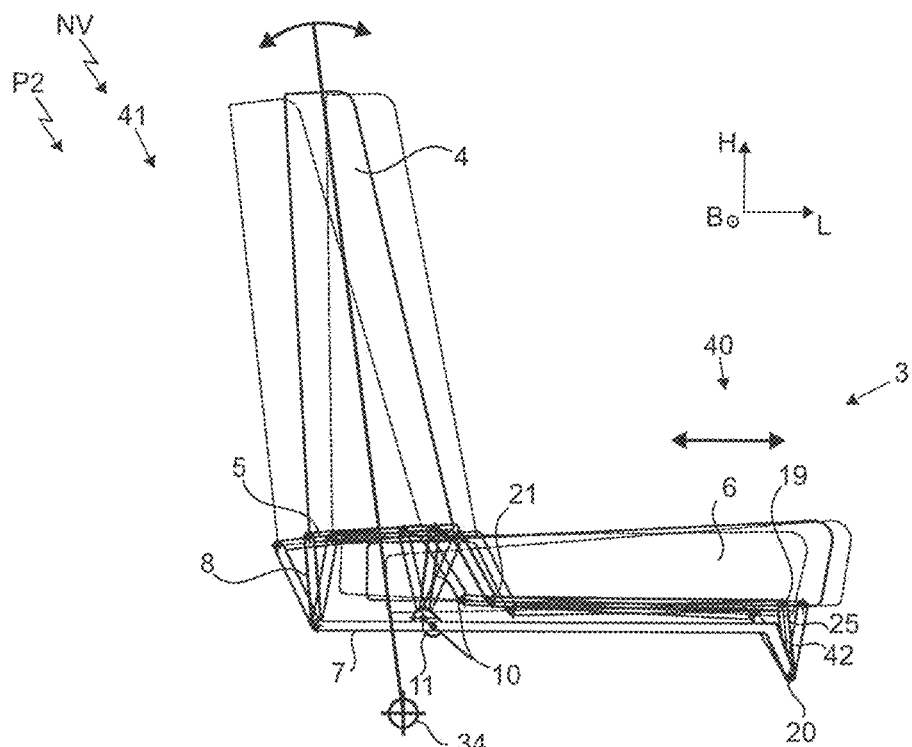
FIG. 5D shows a comparison between FIG. 5A-5C.

In the comparison of FIGS. 5A, 5B and 5C shown in FIG. 5D, it can be seen that the backrest base part 5 now has a rotational movement about a fictitious axis of rotation 34, which also results in a rotational movement of the seat part 6. In the event the vehicle performs a pitching movement, the vehicle seat can therefore effectively absorb this pitching movement. However, compared to FIG. 4D, the fictitious axis of rotation 34 is shifted upwards in the height direction H since the angle between the first connecting line 22 and the second connecting line 23 has increased.

Figure 6:
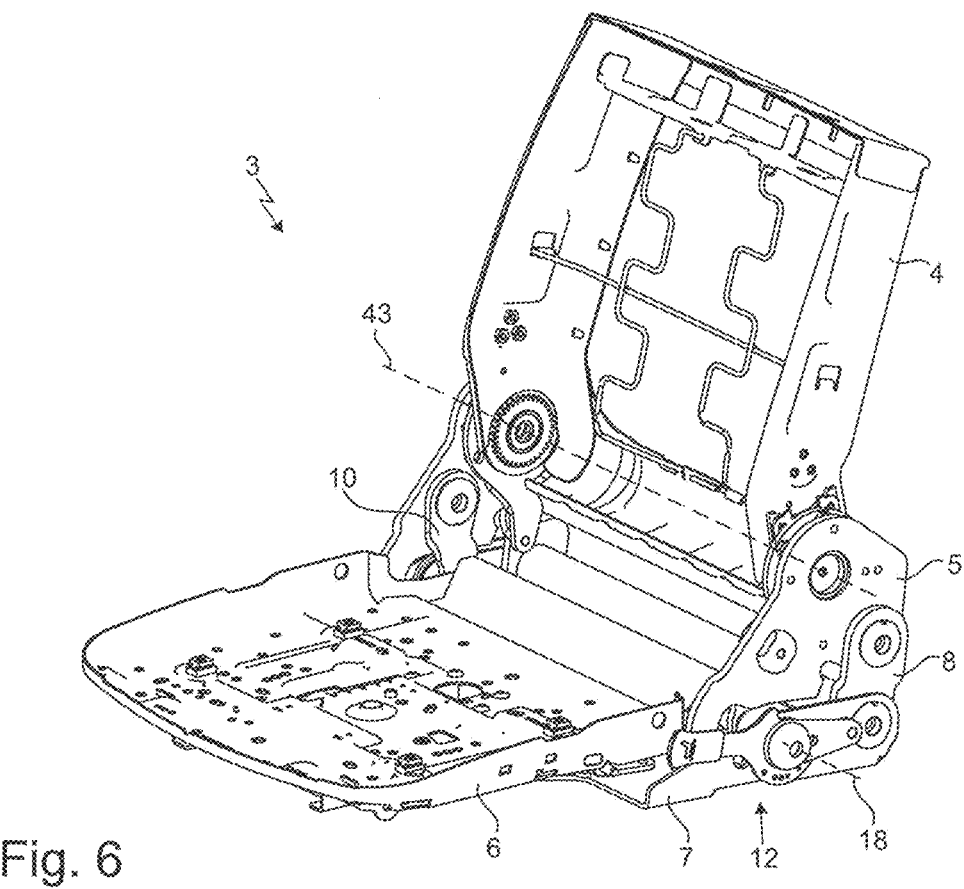
FIG. 6 is a perspective view of a vehicle seat.

In FIG. 6, the vehicle seat 3 is now shown in a non-schematic representation. Here, a backrest part 4 can be seen, which is connected to the backrest base part 5 so as to be rotatable about a tenth axis of rotation 43 by means of a rotating device 44.

The adjustment device 12 can also be seen, which is connected to the seat base part 7 such that it can rotate about the sixth axis of rotation.

Figure 7:
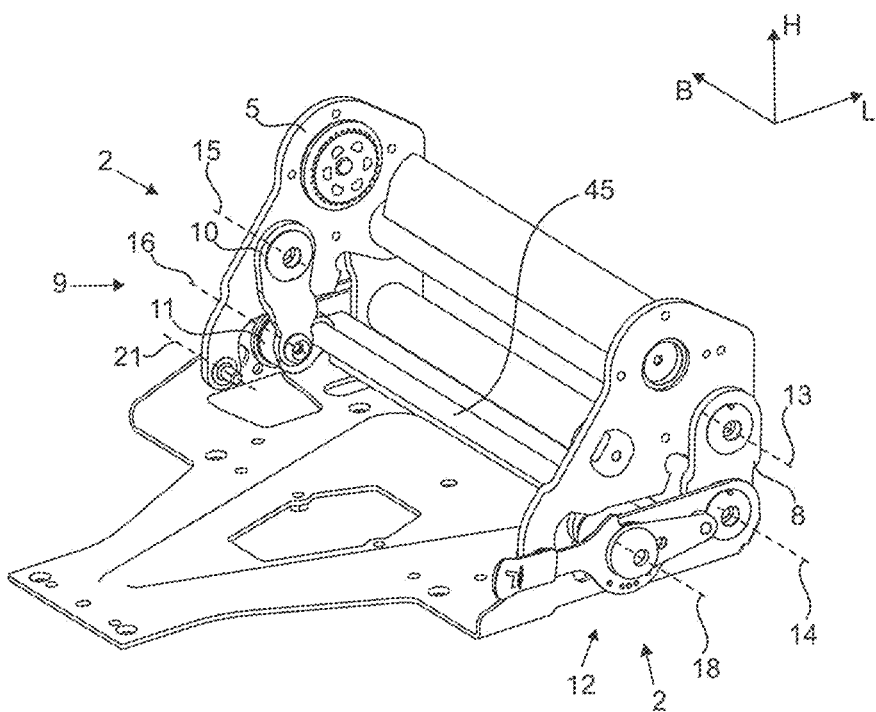
FIG. 7 is a more detailed representation of the vehicle seat of FIG. 6.

In FIG. 7, only the backrest base part 5 as well as the seat base part 7 and the lever assembly 2 are shown to make essential elements easier to see.

As can be seen in particular, two lever assemblies 2 are shown in each case on the left and the right of the backrest base part 5, when viewed in the longitudinal direction L, the adjustment device 12 being arranged on only one lever assembly 2.

In order to be able to transfer the movement of the adjustment device 12 and the movement of the second lever element part to the second lever assembly 2, the second lever element parts 11 are connected by means of a connecting element 45 extending in the width direction B, the connecting element 45 preferably being rigidly connected, for example welded, to the second lever element parts 11.

Figure 8:
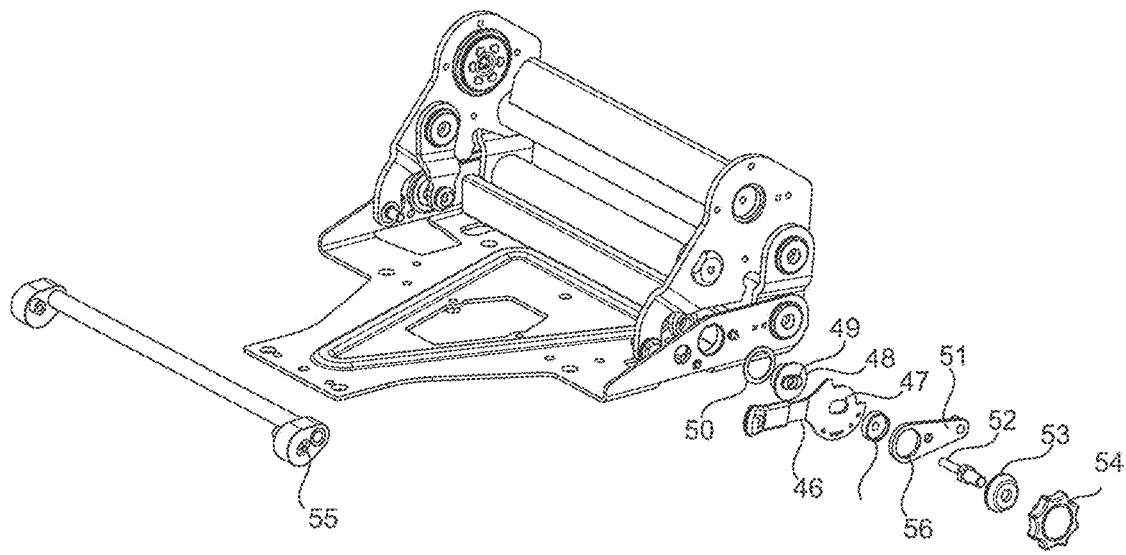
FIG. 8 is an exploded view of FIG. 7.
Figure 9A:
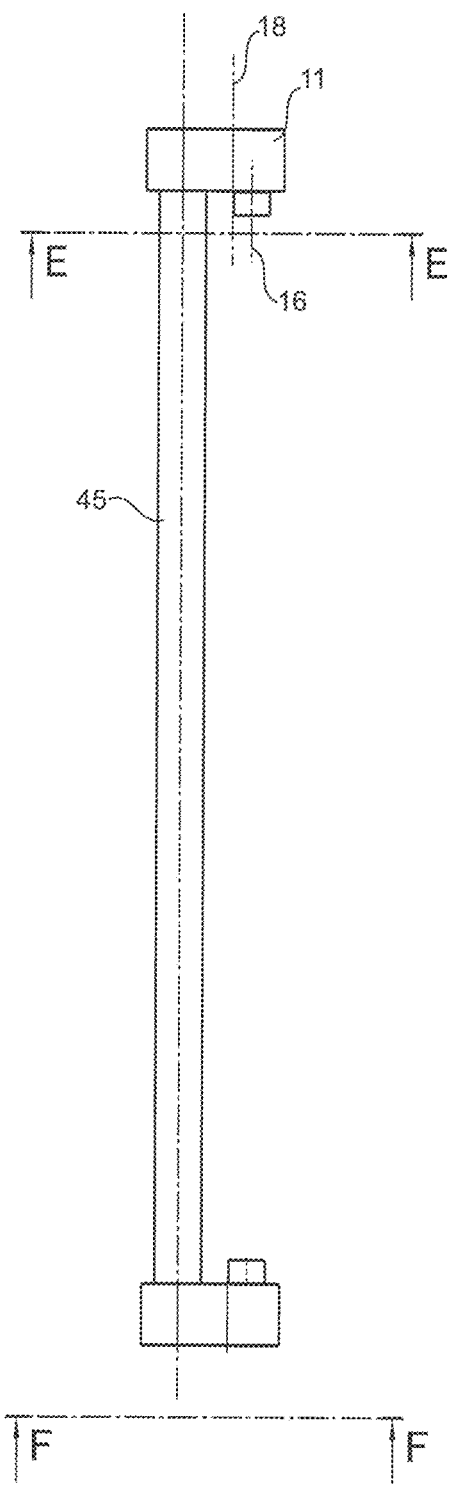
FIG. 9A is a plan view of the second lever element part.
Figure 9B:
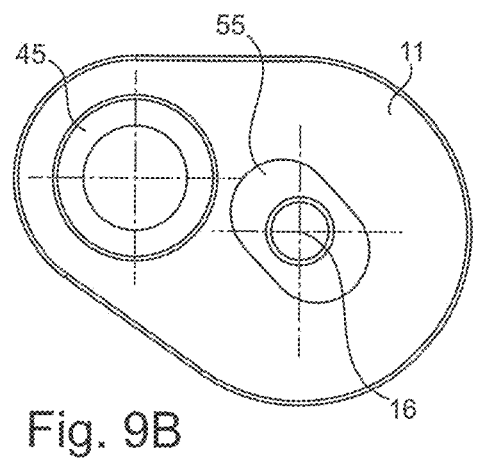
FIG. 9B shows section F-F from FIG. 9A.
Figure 9C:
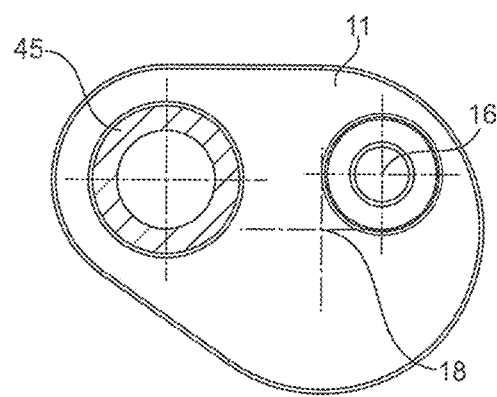
FIG. 9C shows section E-E from FIG. 9A.

FIG. 8 is an exploded view of the adjustment device 12 so that its function and structure can be described in more detail in the further FIGS. 9A, 9B and 9C.

The adjustment device 12 preferably comprises a lever element 46 having an elongated hole 47. An intermediate element 48 is further provided, which is arranged between the seat base part 7 and the lever element 46 and which has a region 49 which is complementary to the elongated hole 47 and can be connected thereto. This intermediate element comprises a further region on the opposite side of the region 49, which is also complementary to a further elongated hole 55 and can be connected thereto. The elongated holes 47, 55 each have an extension direction with the extension directions enclosing an angle.

A washer element 50 is more preferably arranged between the seat base part 7 and the intermediate element 49.

In addition, a holding element 51 having an opening 56 is preferably provided, the holding element 51 being spaced apart from the lever element 46 by means of a further intermediate element 57.

Even more preferably, a bolt element 52 is provided onto which a pressure element 53 and a rotary element 54 can be placed. The bolt element 53 extends as far as the further elongated hole 55 and is rotatably connected thereto, for example by means of a thread.

By turning the rotary element 54, the bolt element is screwed into the thread of the elongated hole 55 so that the pressure element 53 builds up pressure on the holding element 51 so that the lever element 46 is also subjected to pressure. This compression makes a non-positive locking possible.

The opening 56 is in this case smaller than the diameter of the pressure element 53.

FIG. 9A shows again the second lever element part 11 and the further second lever element part 11, which are rigidly connected to one another by the connecting element 45.

The fourth axis of rotation 16 and the sixth axis of rotation 18 can be seen. In particular, the fourth axis of rotation 16 and the sixth axis of rotation 18 are at a distance from each other that is greater than zero.

The section F-F can be seen in FIG. 9B, such that the further elongated hole 55 with the fourth axis of rotation 16 are visible.

The section E-E can be seen in FIG. 9C, which again clearly shows how the fourth axis of rotation 16 and the sixth axis of rotation 18 are in relation to one another.

To summarise once more, according to the present invention, any embodiments can be combined and supplemented with one another. Identical components are provided with the same reference signs, but it is possible that the reference signs are omitted for clarity purposes.

All features disclosed in the application documents are claimed as being essential to the invention provided they are, individually or in combination, novel over the prior art.

LIST OF REFERENCE SIGNS

1 Utility vehicle
2 Lever assembly
3 Vehicle seat

4 Backrest part
5 Backrest base part
6 Seat part
7 Seat base part
8 First lever element
9 Second lever element
10 First lever element part
11 Second lever element part
12 Adjustment device
13 First axis of rotation
14 Second axis of rotation
15 Third axis of rotation
16 Fourth axis of rotation
17 Fifth axis of rotation
18 Sixth axis of rotation
19 Seventh axis of rotation
20 Eighth axis of rotation
21 Ninth axis of rotation
22 First connecting line
23 Second connecting line
24 Third connecting line
25 Third lever element part
26 First distance
27 Second distance
28 First angle
29 Second angle
30 Third angle
31 Fourth angle
32 Fifth angle
33 Third distance
34 Fictitious axis of rotation
35 Third distance
36 Fourth distance
37 Fifth distance
38 Sixth distance
39 Seventh distance
40 Front region
41 Rear region
42 Fourth connecting line
43 Tenth axis of rotation
44 Rotating device
45 Connecting element
46 Lever element
47 Elongated hole
48 Intermediate element
49 Region
50 Washer element
51 Holding element
52 Bolt element
53 Pressure element
54 Rotary element
55 Further elongated hole
56 Opening
57 Further intermediate element
P1 First position
P2 Second position
P3 Third position
N Neutral setting
NV Forwardly displaced setting
NH Rearwardly displaced setting
L Vehicle seat length direction
B Vehicle seat width direction
H Vehicle seat height direction

What is claimed is:

1. A vehicle seat having a backrest part and a backrest base part, a seat part and a seat base part, wherein the seat part is displaceable with respect to the seat base part, wherein the backrest part is rotatably connected to the backrest base part, wherein the backrest base part and the seat base part are connected to one another by a lever assembly, wherein the lever assembly comprises a first lever element, which is rotatably connected to the backrest base part and the seat base part, and a second lever element, which comprises a first lever element part and a second lever element part, wherein the first lever element part is rotatably connected to the backrest base part and the second lever element part, wherein the second lever element part is rotatably connected to the first lever element part and an adjustment device, and wherein the adjustment device is rotatably connected to the seat base part.

2. The vehicle seat according to claim 1, wherein the first lever element is rotatably connected to the backrest base part about a first axis of rotation and rotatably connected to the seat base part about a second axis of rotation, wherein the first lever element part is rotatably connected to the backrest base part about a third axis of rotation and rotatably connected to the second lever element part about a fourth axis of rotation, wherein the second lever element part is rotatably connected to the adjustment device about a fifth axis of rotation, and wherein the adjustment device is rotatably connected to the seat base part about a sixth axis of rotation.

3. The vehicle seat according to claim 2, wherein the sixth axis of rotation is fixedly arranged with respect to the seat base part, wherein the second axis of rotation is fixedly arranged with respect to the seat base part, wherein the first axis of rotation is fixedly arranged with respect to the backrest base part, and wherein the third axis of rotation is fixedly arranged with respect to the backrest base part.

4. The vehicle seat according to claim 2, wherein a first connecting line between the first axis of rotation to the second axis of rotation, a second connecting line between the third axis of rotation to the fourth axis of rotation and a third connecting line between the fourth axis of rotation and the sixth axis of rotation are formed.

5. The vehicle seat according to claim 1, wherein the seat part is rotatably connected to the backrest base part, wherein a third lever element part is rotatably connected to the seat part and the seat base part.

6. The vehicle seat according to claim 2, wherein a first distance between the first axis of rotation and the second axis of rotation corresponds to a second distance between the third axis of rotation and the fourth axis of rotation.

7. The vehicle seat according to claim 4, wherein a first position, a second position, and a third position of the second lever element part can be adjusted by the adjustment device, wherein in the first position the first connecting line is parallel to the second connecting line, wherein in the second position the first connecting line and the second connecting line enclose a first angle, and wherein in the third position the first connecting line and the second connecting line enclose a second angle.

8. The vehicle seat according to claim 4, wherein the second connecting line and the third connecting line enclose a third angle in the first position, a fourth angle in the second position and a fifth angle in the third position.

9. The vehicle seat according to claim 6, wherein a third distance between the third axis of rotation and the fifth axis of rotation can be changed by the adjustment device so that a position of a fictitious axis of rotation can be changed.

10. The vehicle seat according to claim 1, wherein the backrest base part can be adjusted with respect to the seat base part by the lever assembly, and wherein a seat part inclination of the seat part and a longitudinal position relative to the seat base part can be adjusted.

\* \* \* \* \*